United States Patent
Torii et al.

(10) Patent No.: US 8,303,186 B2
(45) Date of Patent: Nov. 6, 2012

(54) WHEEL BEARING APPARATUS INCORPORATED WITH A WHEEL SPEED DETECTING APPARATUS

(75) Inventors: Akira Torii, Iwata (JP); Takayuki Norimatsu, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 12/503,908

(22) Filed: Jul. 16, 2009

(65) Prior Publication Data
US 2009/0274404 A1 Nov. 5, 2009

Related U.S. Application Data

(63) Continuation of application No. PCT/JP2008/000041, filed on Jan. 17, 2008.

(30) Foreign Application Priority Data

Jan. 17, 2007 (JP) .................................. 2007-008363

(51) Int. Cl.
F16C 32/00 (2006.01)
F16C 13/00 (2006.01)
G01P 3/48 (2006.01)

(52) U.S. Cl. ........................ 384/448; 384/544; 324/174

(58) Field of Classification Search .................. 384/448, 384/543, 544, 589; 301/105.1; 324/173, 324/174, 207.22, 207.55
See application file for complete search history.

(56) References Cited

U.S. PATENT DOCUMENTS

| | | | | |
|---|---|---|---|---|
| 4,948,277 A | * | 8/1990 | Alff ............................... | 384/448 |
| 5,004,358 A | * | 4/1991 | Varvello et al. ................ | 384/446 |
| 5,434,503 A | * | 7/1995 | Rigaux et al. .................. | 324/174 |
| 5,438,260 A | * | 8/1995 | Rigaux et al. .................. | 324/166 |
| 6,190,051 B1 | * | 2/2001 | Angelo et al. ................. | 384/448 |
| 6,774,622 B2 | * | 8/2004 | Faetanini et al. .............. | 324/174 |
| 2002/0018606 A1 | | 2/2002 | Toda et al. | |
| 2005/0093245 A1 | | 5/2005 | Kageyama et al. | |
| 2006/0153481 A1 | | 7/2006 | Sentoku et al. | |
| 2007/0076993 A1 | * | 4/2007 | Koyagi ......................... | 384/448 |
| 2007/0104402 A1 | * | 5/2007 | Koyagi et al. ................. | 384/448 |
| 2007/0177834 A1 | * | 8/2007 | Koyagi et al. ................. | 384/448 |

FOREIGN PATENT DOCUMENTS

| | | |
|---|---|---|
| EP | 1 517 148 | 3/2005 |
| EP | 1 160 492 | 9/2005 |
| EP | 1 610 013 | 12/2005 |
| JP | 2002-054647 | 2/2002 |
| JP | 2004-264056 | 9/2004 |

(Continued)

*Primary Examiner* — James Pilkington
(74) *Attorney, Agent, or Firm* — Harness, Dickey & Pierce, P.L.C.

(57) ABSTRACT

A wheel bearing apparatus incorporating a wheel speed detecting apparatus has an outer member and an inner member. A sensor holder with an embedded wheel speed detecting sensor is mounted on an inner side end of the outer member. A pulser ring has an encoder with circumferential characteristics that alternately and equidistantly change. A metal core is press formed from a steel plate and insert-molded into the sensor holder. A sealing member is integrally bonded to the metal core. A connector for electrically connecting the wheel speed detecting sensor to a harness, connected to an electronic circuit, is mounted at a predetermined position on the circumference of the sensor holder. The connector projects radially outward from the circumference at a predetermined inclined. A recess is formed in the connector. The recess is fit onto an inner side end of the outer member in a manner to cover the inner side end, via a predetermined interface.

5 Claims, 6 Drawing Sheets

FOREIGN PATENT DOCUMENTS

| | | |
|---|---|---|
| JP | 2005-098332 | 4/2005 |
| JP | 2006-183713 | 7/2006 |
| WO | WO2004/072500 | 8/2004 |
| WO | WO2005/040648 * | 5/2005 |

* cited by examiner (a)

(b)

WHEEL BEARING APPARATUS INCORPORATED WITH A WHEEL SPEED DETECTING APPARATUS

CROSS-REFERENCE TO RELATED APPLICATIONS

This application is a continuation of International Application No. PCT/JP2008/000041, filed Jan. 17, 2008, which claims priority to Japanese Application No. 2007-008363, filed Jan. 17, 2007. The disclosures of the above applications are incorporated herein by reference.

FIELD

The present disclosure relates to a wheel bearing apparatus incorporated with a wheel speed detecting apparatus to detect a rotational speed of a wheel of a vehicle.

BACKGROUND

A wheel bearing apparatus that supports a wheel of a vehicle relative to a suspension apparatus and incorporates a wheel speed detecting apparatus to detect a rotational speed of a wheel of a vehicle to control the anti-lock braking system (ABS) is known. Such a bearing apparatus generally includes a sealing apparatus between an inner member and an outer member. The inner and outer members are rotatable relative to each other via rolling elements (balls). A magnetic encoder with magnetic poles alternately arranged along its circumference is integrated into the sealing apparatus. A wheel speed detecting sensor is provided to detect the variation in magnetic poles of the magnetic encoder according to the rotation of the wheel.

The wheel speed sensor is usually mounted on a knuckle after the wheel bearing apparatus is mounted on the knuckle to form a suspension apparatus. Recently, however, a wheel bearing apparatus incorporated with a wheel speed detecting apparatus has been proposed. A wheel speed detecting sensor is self-contained within the wheel bearing in order to reduce the size of the wheel bearing apparatus as well as to eliminate troublesome air gap adjustment between the wheel speed sensor and the magnetic encoder.

An example of a prior art wheel bearing apparatus incorporated with a wheel speed detecting apparatus is shown in FIG. 5. This wheel bearing apparatus incorporated with a wheel speed detecting apparatus includes a detachably combined unit. The unit includes a wheel hub 55, a double row rolling bearing 50, and a constant velocity universal joint 61. The double row rolling bearing 50 has an outer member 51, an inner member 52, and double row balls 53, 53. The outer member 51 is integrally formed on its outer circumference with a body mounting flange 51b. The flange 51b is mounted on a knuckle 54 to form a portion of a suspension of a vehicle. The outer member 51, on its inner circumference, has double row outer raceway surfaces 51a, 51a.

The inner member 52 includes the wheel hub 55 and an inner ring 56 secured on the wheel hub 55. The wheel hub 55 is formed on one end with a wheel mounting flange 55d, to mount a wheel (not shown). The wheel hub 55 outer circumference has one inner raceway surface 55a opposing one of the double row outer raceway surfaces 51a, 51a. A cylindrical portion 55b extends from the inner raceway surface 55a. The cylindrical portion 55b inner circumference includes a serration 55c for torque transmission.

The inner ring 56 is formed on its outer circumference with the other inner raceway surface 56a opposite to the other of the double row outer raceway surfaces 51a, 51a. The inner ring 56 is press-fit onto the cylindrical portion 55b of the wheel hub 55, via a predetermined interface. The inner ring 56 is axially secured on the cylindrical portion 55b by a caulked portion 57. The caulked portion 57 is formed by radially outwardly plastically deforming the end of the cylindrical portion 55b.

Double row balls 53, 53 are contained between the double row outer raceway surfaces 51a, 51a and the inner raceway surface 55a, 56a, respectively, of the wheel hub 55 and the inner ring 56. The balls are rollably held by cages 58, 58. In addition, seals 59, 60 are mounted in annular openings formed by the outer member 51 and the inner member 52. The seals 59, 60 prevent leakage of grease contained in the bearing and the entry of rain water or dusts from the outside.

The constant velocity universal joint 61 includes an outer joint member 62, joint inner ring 63, a cage 64 and torque transmitting balls 65. The outer joint member 62 has a cup-shaped mouth portion 66, a shoulder portion 67, and a shaft portion 68. The shoulder portion 67 forms a bottom of the mouth portion 66. The shaft portion 68 axially integrally extends from the shoulder portion 67. The shaft portion 68 is formed, on its outer circumference, with a serration 68a to engage the serration 55c of the wheel hub 55. An outer screw thread 68b is formed on the end of the serration 68a. The outer joint member 62 is inserted into the wheel hub 55, via serrations 55c, 68a for torque transmission. The wheel hub 55 and the outer joint member 62 are united by a securing nut 69 fastened onto the outer screw thread 68b.

As shown in FIG. 6, the seal 60 is formed by a so-called pack seal. It is a combination of a first sealing ring 70 and a second sealing ring 71. The first sealing ring 70 is mounted on the outer member 51. The first sealing ring 70 has a metal core 72 with a substantially L-shaped cross-section. A sealing member 73 is mounted on the metal core 72. The sealing member 73 includes a main lip 73a and an auxiliary lip 73b.

The second sealing ring 71 is mounted on the inner ring 56. The second sealing ring 71 has a metal core 74 with a substantially L-shaped cross-section. A radial lip 75 is mounted on the metal core 74. A pulser ring 76 is mounted on the second sealing ring 71. The pulser ring 76 includes a metal core 77 with a substantially C-shaped cross-section. The pulser ring 76 is fit onto the metal core 74. A multi-pole magnet rotor 78 is mounted on the metal core 77. The multi-pole magnet rotor 78 is formed of rubber or resin mingled with magnetic powder. It has N and S poles arranged alternately along its circumferential direction. It is bonded onto the metal core 77 via vulcanized adhesion. The multi pole magnet rotor 78 is polarised from a radial direction.

The metal core 72 of the first sealing ring 70 is covered by a sensor holder 79 along its entire outer circumference. The sensor holder 79 is made of non-magnetic resin such as polyphenylene sulfide (PPS). A magnetic sensor 80 is embedded in the sensor holder 79. A female connector 81 electrically connects the magnetic sensor 80. A harness (not shown), of an electronic circuit on a body of vehicle, is integrally molded with the sensor holder 79 at a predetermined circumferential position so that it projects radially outward.

Accordingly the pulser ring 76 can be prevented from being contaminated by dusts etc. by the radial lip arranged outside of the pulser ring 76. In addition, since the pulser ring 76 is isolated from the balls 53 and the inner and outer raceway surfaces by the main lip 73a of the first sealing ring 70 and the auxiliary lip 73b. Thus, it is possible to prevent the pulser ring 76 from being contaminated by abraded metal powder generated by rolling of the balls. Accordingly, this keeps the detecting accuracy. (See, Japanese Laid-open Patent Publication No. 98332/2005)

In the prior art wheel bearing apparatus incorporated with a wheel speed detecting apparatus, the female connector 81 is formed to project radially outward and vertically to the axis of the bearing. Thus, a strong pressing force is applied to the first sealing ring 70, the magnetic sensor 80, via the connector 81, and thus the sensor holder 79 during connection of the connector 81. Accordingly, the positional accuracy of the first sealing ring 70 and the magnetic sensor 80 tends to be diminished. Additionally, the sensor holder 79 itself, made of plastic resin, may be broken.

SUMMARY

It is, therefore, an object of the present disclosure to provide a wheel bearing apparatus incorporating a wheel speed detecting apparatus that avoids the strong pressing force applied to the first sealing ring and the magnetic sensor during connection of the connector. Thus, the detecting apparatus can be assembled without damaging the first sealing ring and the magnetic sensor. Also, the detecting apparatus keeps a high assembling accuracy to obtain a desired wheel speed detection accuracy.

In order to achieve the object, a wheel bearing apparatus incorporating a wheel speed detecting apparatus comprises an outer member integrally formed on its outer circumference with a body mounting flange to be mounted on a suspension apparatus of a vehicle. The inner circumference of the outer member includes double row outer raceway surfaces. An inner member includes a wheel hub and an inner ring. The wheel hub, at one end, has an integrally formed wheel mounting flange on its outer circumference. A cylindrical portion axially extends from the mounting flange. The inner ring is fit onto the cylindrical portion of the wheel hub. The inner member is formed on its outer circumference with double row inner raceway surfaces arranged opposite to the double row outer raceway surfaces. Double row rolling elements are freely rollably contained between the inner and outer raceway surfaces, respectively, of the inner member and the outer member. Seals are mounted in the annular openings formed between the outer member and the inner member. A sensor holder is injection molded from a synthetic resin. A wheel speed detecting sensor is embedded in the holder. The holder is mounted on an inner side end of the outer member. The inner side seal of the seals includes a slinger press formed of a steel plate into a substantially L-shaped cross-section. The seal is mounted onto the outer circumference of the inner ring. A pulser ring has an encoder with circumferential characteristics that alternately and equidistantly change. A metal core is press formed of a steel plate and insert-molded into the sensor holder. A sealing member is integrally bonded onto the metal core. A connector, electrically connecting the wheel speed detecting sensor, to a harness, connected to an electronic circuit, is mounted at a predetermined position on the circumference of the sensor holder. The connection projects radially outward from the circumference at a predetermined inclined. A recess is formed in the connector. The recess is fit onto an inner side end of the outer member in a manner to cover the inner side end, via a predetermined interface.

The wheel bearing apparatus incorporating the wheel speed detecting apparatus has the connector to electrically connect the wheel speed detecting sensor, to a harness, connected to an electronic circuit, that is mounted at a predetermined position on the circumference of the sensor holder so that the connect projects radially outward from the circumference at a predetermined inclined. A recess is formed in the connector. The recess is fit onto an inner side end of the outer member in a manner to cover it, via a predetermined interface. The pressing force applied to the connector during connection of the harness is mostly all received by the end of the outer member. Thus, it is possible to prevent a large force from being applied onto the sealing ring and the wheel speed sensor. Accordingly, it is possible to provide a wheel bearing apparatus incorporating a wheel speed detecting apparatus that can improve the reliability during assembly of the wheel bearing apparatus and achieve high accuracy during detection of the wheel speed.

The pulser ring is fit onto the slinger. The encoder is integrally bonded on the outer circumference of the pulser ring. This makes it possible to reduce the size of the seals and to improve sealability.

The seal member has a plurality of sealing lips. The sealing lips slidingly contact the slinger and/or the pulser ring. This makes it possible to prevent the pulser ring from being contaminated by dust etc. Thus, this avoids deterioration of the detecting accuracy.

An outer circumference of the metal core is formed so that it is bent to surround the end of the outer member. This makes it possible to reinforce the recess of the connector. Thus, this increases the rigidity and strength of the connector and accordingly further improves the accuracy of assembly.

The metal core includes a cylindrical portion press-fit into the inner circumference of the end of the outer member. An outer circumferential portion extends from the cylindrical portion radially outward along the end of the outer member and has a substantially L-shaped cross-section. An inner circumferential portion extends from the cylindrical portion radially inward along an inner circumference of the connector and has a substantially L-shaped cross-section. This makes it possible to prevent separation of the metal core and the connector. Also, it prevents entry of rain water or muddy water through the interface between the metal core and the connector. Thus, this improves durability of the connector.

The wheel bearing apparatus incorporating a wheel speed detecting apparatus comprises an outer member integrally formed, on its outer circumference, with a body mounting flange to be mounted on a suspension apparatus of a vehicle. The inner circumference of the outer member has double row outer raceway surfaces. An inner member includes a wheel hub and an inner ring. The wheel hub has, at one end, an integrally formed wheel mounting flange on its outer circumference. A cylindrical portion axially extends from the flange. The inner ring is fit onto the cylindrical portion of the wheel hub. The inner member is formed, on its outer circumference, with double row inner raceway surfaces arranged opposite to the double row outer raceway surfaces. Double row rolling elements are freely rollably contained between the inner and outer raceway surfaces, respectively, of the inner member and the outer member. Seals are mounted in annular openings formed between the outer member and the inner member. A sensor holder is injection molded from synthetic resin. A wheel speed detecting sensor is embedded in the holder. The holder is mounted on an inner side end of the outer member. The inner side seal of the seals comprises a slinger. The slinger is press formed from a steel plate to a substantially L-shaped cross-section. The slinger is mounted onto the outer circumference of the inner ring. A pulser ring has an encoder with circumferential characteristics that alternately and equidistantly change. A metal core is press formed from a steel plate and insert-molded into the sensor holder. A sealing member is integrally bonded to the metal core. A connector, for electrically connects the wheel speed detecting sensor, to a harness, connected to an electronic circuit, is mounted at a predetermined position on the circumference of the sensor holder. The connect projects radially outward from the circumference at a predetermined inclined. A recess is formed in the connector. The recess is fit onto an inner side end of the outer member in a manner to cover the inner side end, via a predetermined interface. The pressing force applied to the connector is mostly all received by the end of the outer member. It is not directly transmitted to the sealing ring and the pulser ring. Thus, it is possible to provide a wheel bearing apparatus incorporating a wheel speed detecting apparatus that can be assembled with ease and achieves desired high accuracy wheel speed detection.

A wheel bearing apparatus incorporating a wheel speed detecting apparatus comprises an outer member integrally formed, on its outer circumference, with a body mounting flange to be mounted on a suspension apparatus of a vehicle. The inner circumference of the outer member includes double row outer raceway surfaces. An inner member includes a wheel hub and an inner ring. The wheel hub has, at one end, an integrally formed wheel mounting flange. The wheel hub outer circumference has an inner raceway surface opposite to one of the double row outer raceway surfaces. A cylindrical portion axially extends from the inner raceway surface. The inner ring is formed, on its outer circumference, with an inner raceway surface opposite to the other one of the double row raceway surfaces. Double row rolling elements are freely rollably contained between the inner and outer raceway surfaces, respectively, of the inner member and the outer member. Seals are mounted in annular openings formed between the outer member and the inner member. A sensor holder formed by injection molding of synthetic resin includes an embedded wheel speed detecting sensor. The sensor holder is mounted on an inner side end of the outer member. The inner side seal of the seals includes a slinger press formed from a steel plate to a substantially L-shaped cross-section. The slinger is mounted onto the outer circumference of the inner ring. A pulser ring has an encoder with circumferential characteristics that alternately and equidistantly change. A metal core is press formed from a steel plate and is insert-molded into the sensor holder. A sealing member is integrally bonded to the metal core. The pulser ring is fit onto the slinger. The encoder is integrally bonded on the outer circumference of the pulser ring. A connector electrically connecting the wheel speed detecting sensor to a harness, connected to an electronic circuit, is mounted at a predetermined position on the circumference of the sensor holder. The connection projects radially outward from the circumference at a predetermined inclined. A recess is formed in the connector. The recess is fit onto an inner side end of the outer member in a manner to cover the inner side end, via a predetermined interface.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

A preferred embodiment of the present disclosure will be hereinafter described with reference to the drawings.

Figure 1:
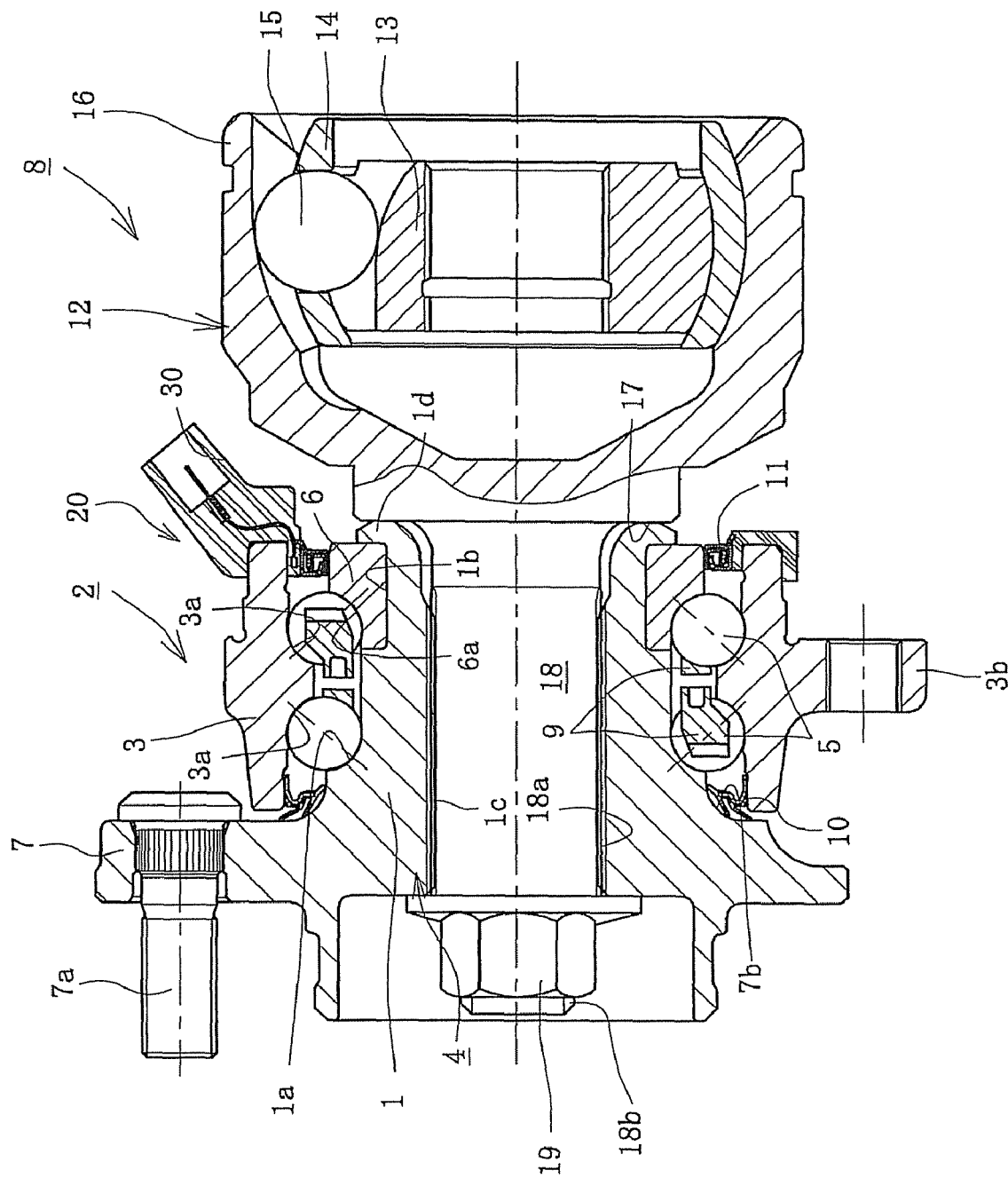
FIG. 1 is a longitudinal section view of one embodiment of a wheel bearing apparatus incorporating a wheel speed detecting apparatus of the present disclosure.
Figure 2:
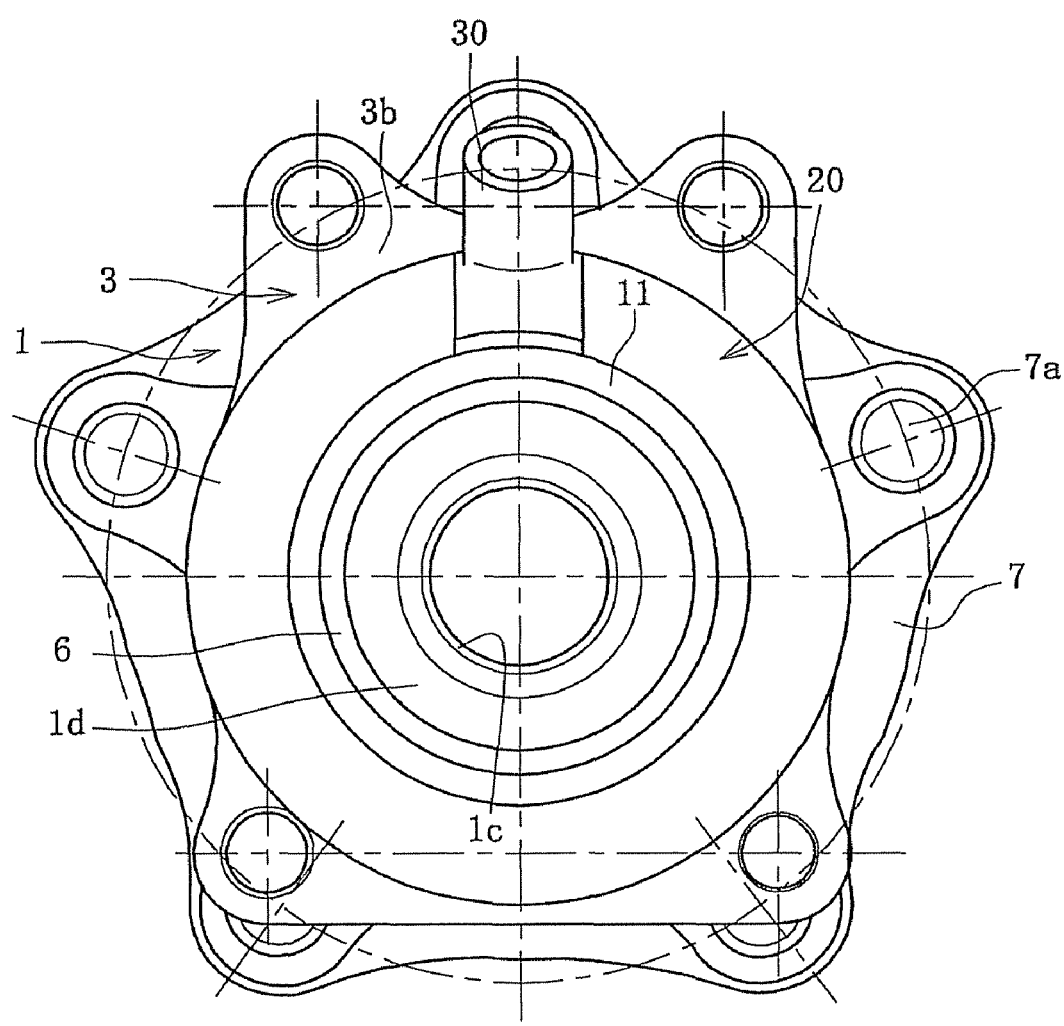
FIG. 2 is a side elevation view of a bearing portion of FIG. 1.
Figure 3:
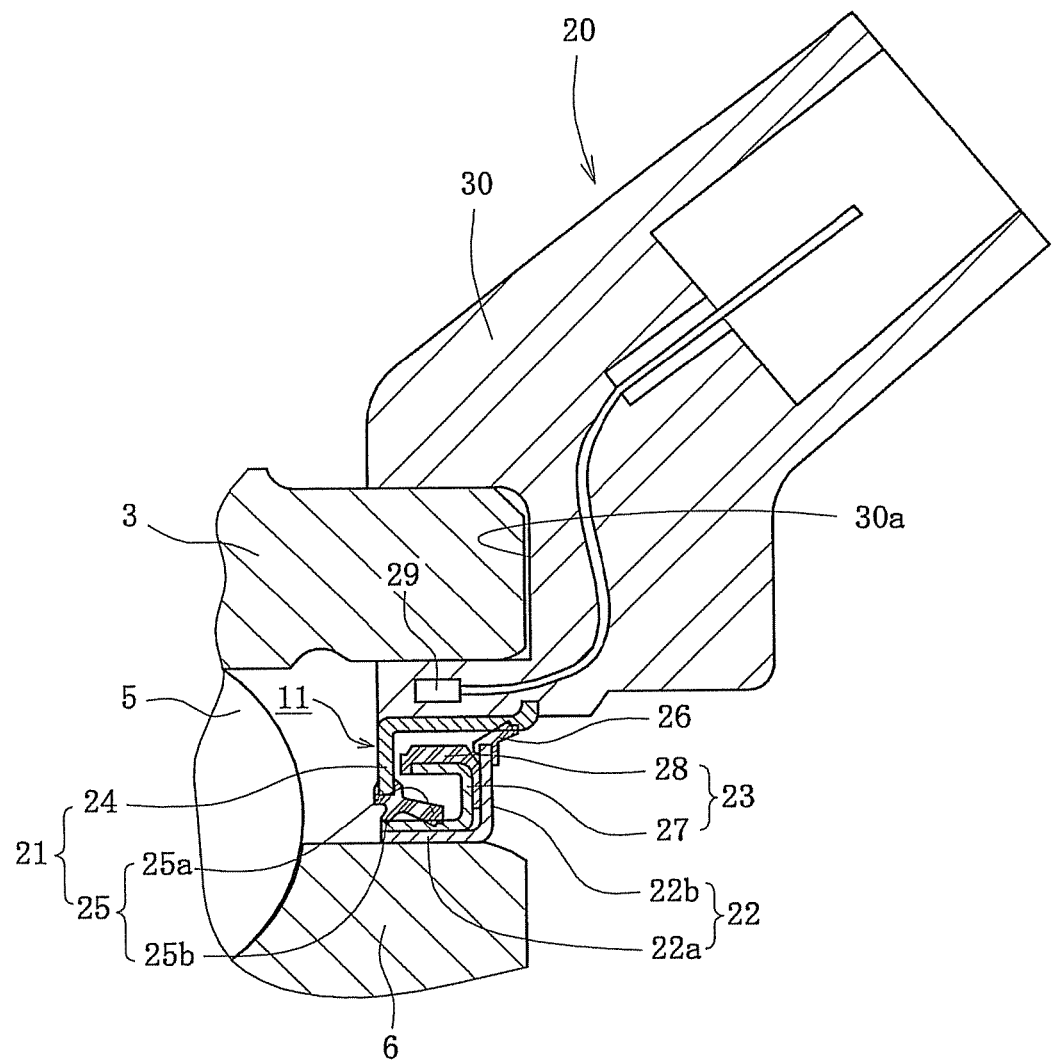
FIG. 3 is a partially enlarged view of FIG. 1.

FIG. 1 is a longitudinal section view of a first embodiment of a wheel bearing apparatus incorporating a wheel speed detecting apparatus of the present disclosure. FIG. 2 is a side elevation with a bearing portion of FIG. 1. FIG. 3 is a partially enlarged view of FIG. 1. FIG. 4(a) is a partially enlarged view of a modification of the wheel speed detecting apparatus. FIG. 4(b) is a partially enlarged view of another modification of the wheel speed detecting apparatus. In the description below, an outer side of a wheel bearing apparatus, when it is mounted on a vehicle, is referred to as an "outer side" (a left side in FIG. 1). An inner side of a wheel bearing apparatus is referred to as the "inner side" (a right side in FIG. 1).

The wheel bearing apparatus incorporating with a wheel speed detecting apparatus is a third generation type for a driving wheel. It is formed as a unit of a wheel hub 1, a double row rolling bearing 2 and a constant velocity universal joint 8. The double row rolling bearing 2 includes an outer member 3, an inner member 4 and double row rolling elements (balls) 5, 5. The outer member 3 is made of medium carbon steel including carbon of 0.40~0.80% by weight such as S53C. The outer member outer circumference is formed with a body mounting flange 3b to be mounted on a knuckle (not shown) to form a suspension apparatus of a vehicle. The outer members inner circumference has double row outer raceway surfaces 3a, 3a. The double row outer raceway surfaces 3a, 3a are hardened by high frequency induction quenching to have a surface hardness of 58~64 HRC.

The inner member 4 includes the wheel hub 1 and an inner ring 6 secured on the wheel hub 1. The wheel hub 1 is integrally formed with a wheel mounting flange 7 at one end. The wheel hub outer circumference includes one (outer side) inner raceway surface 1a opposite to the double row outer raceway surfaces 3a, 3a. A cylindrical portion 1b extends from the inner raceway surface 1a. The wheel hub inner circumference includes a serration (or spline) 1c for torque transmission. Hub bolts 7a are equidistantly arranged along the periphery of the wheel mounting flange 7.

The wheel hub 1 is made of medium carbon steel including carbon of 0.40~0.80% by weight such as S53C. It is hardened by high frequency induction quenching to have a region from a base 7b of the wheel mounting flange 7, forming a seal land of the outer side seal 10, including the inner raceway surface 1a to the cylindrical portion 1b with a hardness of 58~64 HRC. A caulking portion 1d described later is not quenched and remains as is with a surface hardness after forging.

The inner ring 6 is formed, on its outer circumference, with another (inner side) inner raceway surface 6a. The inner ring 6 is fit onto the cylindrical portion 1b via a predetermined interface. The inner ring 6 is axially secured relative to the wheel hub 1 by the caulked portion 1d. The caulked portion is formed by plastically deforming the end of the cylindrical portion 1b radially outward. The inner ring 6 and the rolling elements 5 are made of high carbon chrome steel such as SUJ2. They are hardened to their core by dip quenching to have a surface hardness of 58~64 HRC.

The double row rolling elements 5, 5 are contained between the double row outer raceway surfaces 3a, 3a of the outer member 3 and the inner raceway surface 1a of the wheel hub 1 and the inner raceway surface 6a of the inner ring 6. The inner raceway surfaces 1a, 6a oppose the double row outer raceway surfaces 3a, 3a. The rolling elements 5, 5 are rollably held by cages 9, 9. An end face of a smaller diameter side of the inner ring 6 abuts against a shoulder of the wheel hub 1. This forms a double row angular contact ball bearing of a so-called back-to-back duplex type bearing. Seals 10, 11 are mounted in annular openings formed between the outer member 3 and the inner member 4 to prevent leakage of lubricating grease sealed in the bearing. Also, they prevent entry of rain water or dust into the bearing from the outside.

The constant velocity universal joint 8 includes an outer joint member 12, a joint inner ring 13, a cage 14 and torque transmitting balls 15. The outer joint member 12 is integrally formed by a cup-shaped mouth portion 16, a shoulder 17, and a shaft portion 18. The shoulder portion 17 forms a bottom of the mouth portion 16. The shaft portion 18 axially extends from the shoulder 17. The shaft portion 18 is formed, on its outer circumference, with a serration 18a that engages the serration 1c of the wheel hub 1. An outer screw thread 18b is at the end of the serration 18a. The outer joint member 12 is inserted into the wheel hub, via the serrations 1c, 18a, until the end face of the caulked portion 1d abuts the shoulder 17 of the outer joint member 12. Accordingly, the wheel hub 1 and the outer joint member 12 can be torque transmittably united and detached by a securing nut 19.

A sensor holder 20 is mounted on the inner side end of the outer member 3. The inner side seal 11 is mounted in an annular opening formed between the sensor holder 20 and the inner ring 6. As shown in FIG. 3, the seal 11 includes an annular sealing plate 21 with a substantially L-shaped cross-section. It also includes a slinger 22 and a pulser ring 23 fit onto the slinger 22. The slinger 22 and pulser ring 23 are oppositely arranged with each other. The sealing plate 21 comprises a metal core 24 insert-molded into the sensor holder 20. A sealing member 25 is integrally bonded to the metal core 24, via vulcanized adhesion.

The metal core 24 is press-formed of an austenitic stainless steel sheet (JIS SUS 304 etc.) or a preserved cold rolled sheet (JIS SPCC etc.). The sealing member 25 is formed of an elastic member such as synthetic rubber and includes an integrally formed main lip 25a and grease lip 25b.

The slinger 22 is formed by pressing austenitic stainless steel sheet (JIS SUS 304 etc.) or a preserved cold rolled sheet (JIS SPCC etc.). It includes a cylindrical portion 22a fit onto the inner ring 6. A standing portion 22b extends radially outward from the cylindrical portion 22a. A radial lip 26 is integrally bonded to the end of the standing portion 22b via vulcanized adhesion.

The pulser ring 23 includes a metal core 27 press-fit onto the cylindrical portion 22a of the slinger 22. A magnetic encoder 28 is integrally bonded to the outer circumference of the metal core 27, via vulcanized adhesion. The metal core 27 is formed by pressing a ferromagnetic steel plate such as ferritic stainless steel sheet (JIS SUS 430 etc.) or preserved cold rolled sheet (JIS SPCC etc.). It is pressed into a generally annular configuration having a substantially C-shaped cross-section.

The main lip 25a and the grease lip 25b of the sealing member 25 slidingly contact the metal core 27. The radial lip 26 of the slinger 22 slidingly contacts the metal core 24 of the sealing plate 21. The magnetic encoder 28 is a rubber magnet formed of an elastomer such as rubber mingled with magnetic powder, such as ferrite. The construed rotary encoder detects the wheel speed and has N and S poles alternately arranged along its circumference.

The seal 11, with such a structure, prevents the pulser ring 23 from being contaminated by dust, etc. In addition, the pulser ring 23 is isolated from the rolling elements 5 and the inner and outer raceway surfaces by sliding contact of the main lip 25a and the grease lip 25b with the sealing plate 21. Thus, the pulser ring 23 is prevented from being struck by abraded metal debris or powder generated by rolling the rolling elements 5. Thus, this avoids deterioration of the detecting accuracy.

In the present disclosure, the sensor holder 20 is made of non-magnetic resin such as polyphenylene sulfide (PPS). A wheel speed detecting sensor 29 is embedded in the holder 20. The detecting sensor 29 is arranged opposite to the magnetic encoder 28, via a predetermined radial air gap. The wheel speed sensor 29 includes a magnetic detecting element, such as a Hall element, a magnetic resistance element (MR element) etc. to change characteristics in accordance with the flowing direction of the magnetic flux. An IC incorporated with a waveform shaping circuit for shaping the output waveform of the magnetic detecting element is also included. This enables wheel speed detection at low cost and high reliability. The sensor holder 20 may be formed of injection moldable synthetic resin e.g. PA (polyamide) 66 or polybutylene terephthalate (PBT) other than PPS.

The sensor holder 20 is integrally formed with a female connector 30 at a predetermined circumferential position on the sensor holder 20. The connector 30 electrically connects the wheel speed detecting sensor 29 and a harness (not shown) connected to an electronic circuit. The connector 30 is formed with a recess 30a that is fit onto an inner side end of the outer member 3 in a manner covering the inner side end, via a predetermined interface. The connector 30 is arranged to project radially outward from the outer member 3 at a predetermined inclined angle. Accordingly, the pressing force applied to the connector 30 during connection of a harness is mostly all received by the end of the outer member. Thus, it is possible to prevent a large force from being applied onto the sealing ring and the wheel speed sensor. Thus, it is possible to provide a wheel bearing apparatus that can improve the reliability during assembly of the wheel bearing apparatus and achieve detection of the wheel speed with high accuracy.

Although it is shown in the illustrated embodiment as an active type wheel speed detecting apparatus with a magnetic encoder 28 and a wheel speed sensor 29, including magnetic detecting elements such as Hall effect elements, it is possible to use a passive type wheel speed detecting apparatus that includes a magnetic encoder, a magnet, annular coil etc.

Figure 4:
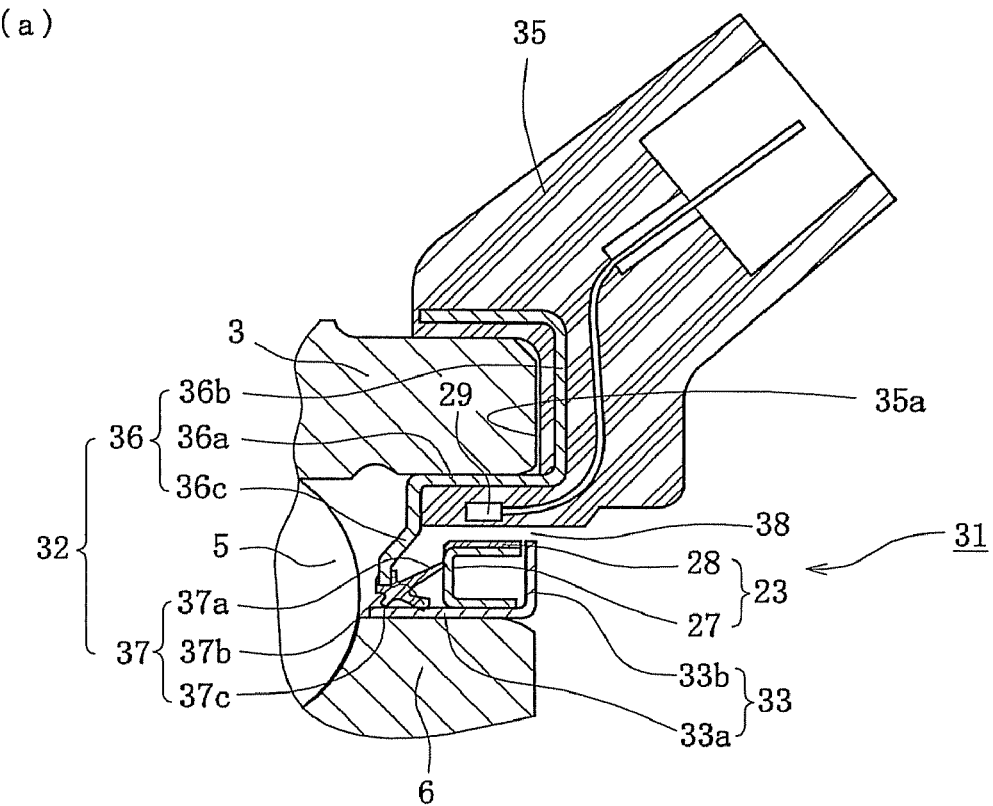
FIG. 4(a) is a partially enlarged view of a modification of the wheel speed detecting apparatus.
FIG. 4(b) is a partially enlarged view of a modification of the wheel speed detecting apparatus.
Figure 4:
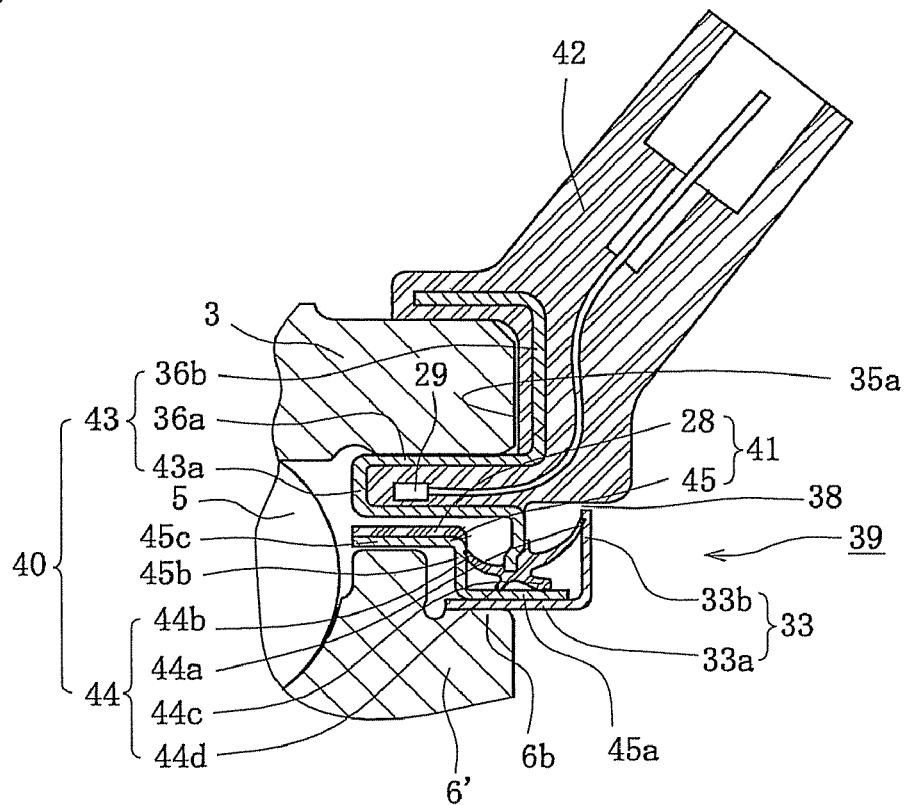
Figure 5:
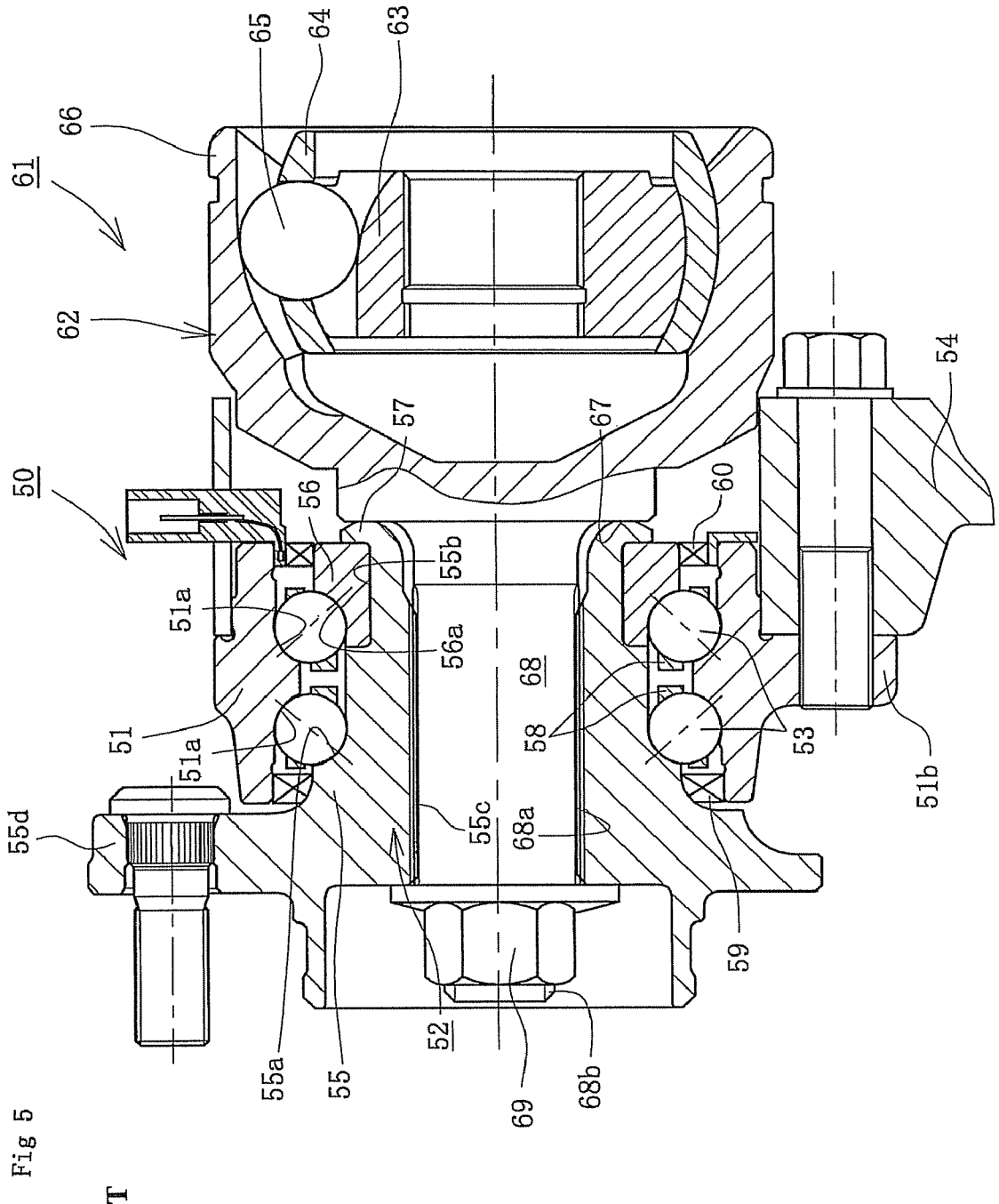
FIG. 5 is a longitudinal section view of a prior art wheel bearing apparatus incorporating a wheel speed detecting apparatus.
Figure 6:
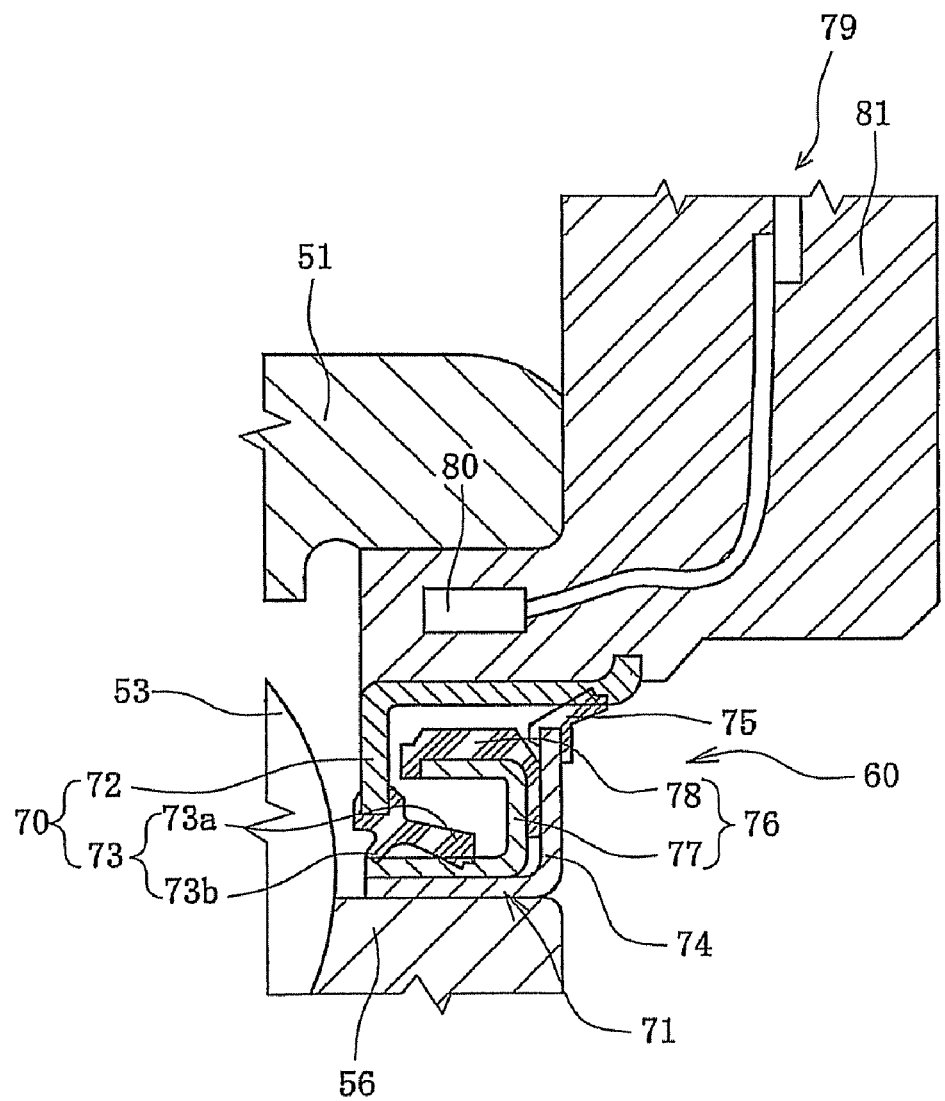
FIG. 6 is a partially enlarged view of FIG. 5.

FIG. 4(*a*) shows a modification of the previously described wheel speed detecting apparatus. The same reference numerals are used in this modification to identify parts or portion having the same functions as those of the previously described embodiment.

An inner side seal 31 includes an annular sealing plate 32, a slinger 33, and the pulser ring 23 fit onto the slinger 33. The sealing plate 32 includes a metal core 36 integrally molded with a connector 35. A sealing member 37 is integrally bonded to the metal core 36, via vulcanized adhesion.

The metal core 36 is press-formed of an austenitic stainless steel sheet (JIS SUS 304 etc.) or a preserved cold rolled sheet (JIS SPCC etc.). The metal core 36 includes a cylindrical portion 36a, an outer circumferential portion 36b, and an inner circumferential portion 36c. The cylindrical portion 36a is press-fit into the inner circumference of the end of the outer member 3. The outer circumferential portion 36b extends from the cylindrical portion 36a radially outward along the end portion of the outer member 3. It has a substantially L-shaped cross-section. The inner circumferential portion 36c extends from the cylindrical portion 36a radially inward. The sealing member 37 is formed of an elastic member such as synthetic rubber. The sealing member 37 includes an integrally formed side lip 37a, a main lip 37b and a grease lip 37c.

The slinger 33 is press-formed of an austenitic stainless steel sheet (JIS SUS 304 etc.) or a preserved cold rolled sheet (JIS SPCC etc.). It has a substantially L-shaped cross-section. It includes a cylindrical portion 33a fit onto the inner ring 6 and a standing portion 33b that extends radially outward from the cylindrical portion 33a. The outer circumferential edge of the standing portion 33b is arranged opposite to the connector 35. A slight radial gap is between the two to form a labyrinth seal 38.

The pulser ring 23 includes a metal core 27 press-fit onto the cylindrical portion 33a of the slinger 33. A magnetic encoder 28 is integrally bonded to the outer circumference of the metal core 27, via vulcanized adhesion. The metal core 27 is formed with a substantially C-shaped cross-section and is arranged opposite to the slinger 33. A side lip 37a of the sealing member 37 slidingly contacts the metal core 27. A main lip 37b and a grease lip 37c slidingly contact the cylindrical portion 33a of the slinger 33.

The seal 31 has a structure that prevent the pulser ring 23 from being contaminated by dust, etc. In addition, the pulser ring 23 is isolated from the rolling elements 5 and inner and outer raceway surfaces by the side lip 37a, the main lip 37b and the grease lip 37c of the sealing plate 32 in sliding contact with the pulser ring 23 and the slinger 33. Thus, it is possible to prevent the pulser ring 23 from being struck by abraded metal debris or powder generated by rolling of the rolling elements 5. Thus, this avoids deterioration of detecting accuracy.

In this modification, the connector 35 is formed from synthetic resin such as polyamide. A wheel speed detecting sensor 29 is embedded in the connector 35. The detecting sensor 29 is adapted to be arranged opposite to the magnetic encoder 28, via a predetermined radial air gap. The connector 35 is formed with a recess 35a. The recess 35a is fit onto an inner side end of the outer member 3 in a manner to cover the inner side end, via a predetermined interface. The connector 35 projects radially outward from the outer member 3 at a predetermined inclined angle. Thus, the recess 35a of the connector 35 is reinforced by the metal core 36. The pressing force applied to the connector 35 during connection of a harness is mostly all received by the end of the outer member 3. Thus, it is possible to prevent a large force from being applied to the sealing ring and the wheel speed sensor. Accordingly, it is possible to provide a wheel bearing apparatus incorporating a wheel speed detecting apparatus that improves the reliability during assembly of the wheel bearing apparatus and achieves high accuracy detection of the wheel speed.

FIG. 4(b) shows a further modification of FIG. 4(a). The same reference numerals are used in this modification to identify parts or portion that has the same functions as those of the previously described embodiment. The repeated description will be omitted.

An inner side seal 39 includes an annular sealing plate 40, the slinger 33, and a pulser ring 41 fit onto the slinger 33. The sealing plate 40 includes a metal core 43 integrally molded with a connector 42. A sealing member 44 is integrally bonded to the metal core 43 via vulcanized adhesion.

The metal core 43 is press-formed of an austenitic stainless steel sheet (JIS SUS 304 etc.) of non-magnetic material which does not give harmful effect to the magnetic detection. The metal core 43 includes a cylindrical portion 36a press-fit into the inner circumference of the end of the outer member 3. An outer circumferential portion 36b of the metal core 43 extends from the cylindrical portion 36a radially outward along the end portion of the outer member 3. It has a substantially L-shaped cross-section and includes a second cylindrical portion on the outer circumference of the end of the outer member 3. An inner circumferential portion 43a of the metal core 43 extends from the cylindrical portion 36a radially inward along the inner circumference of the connector 42. It has a substantially L-shaped cross-section.

The sealing member 44 is formed of an elastic member such as synthetic rubber. The sealing member 44 includes integral side lips 44a, 44b, main lip 44c and grease lip 44d. The side lip 44a is in sliding contact with a standing portion 33b of the slinger 33. The side lip 44b is in sliding contact with a standing portion 45b of a metal core 45, forming a pulser ring. The main lip 44c and grease lip 44d are in sliding contact with a cylindrical portion 45a of the sealing plate 40. The cylindrical portion 33a of the slinger 33 is press-fit onto a cylindrical portion 6b of the inner ring 6.

The pulser ring 41 includes the metal core 45 press-fit onto the cylindrical portion 33a of the slinger 33. A magnetic encoder 28 is integrally bonded to the metal core 45, via vulcanized adhesion. The metal core 45 is formed of a steel plate such as ferritic stainless steel sheet (JIS SUS430 etc.) or preserved cold rolled sheet (JIS SPCC etc.). The metal core 45 includes a cylindrical portion 45a press fit onto the cylindrical portion 33a of the slinger 33. A cylindrical outer circumferential portion 45c extends from the cylindrical portion 45a radially outward along the end of the inner ring 6' via a standing portion 45b.

The seal 39 has a structure that prevents the pulser ring 41 from being contaminated by dust etc. Thus, this avoids deterioration of detecting accuracy. The pulser ring 41 is isolated from the outside by the pair of side lips 44a, 44b, the main lip 44c and the grease lip 44d of the sealing plate 40 in sliding contact with the pulser ring 41 and the slinger 33.

Similarly to the previously described embodiment, the connector 42 is formed of synthetic resin such as polyamide. The wheel speed sensor 29 is embedded in the resin and is arranged opposite to the magnetic encoder 28, via a predetermined radial gap. The connector 42 is formed with the recess 35a that fits onto the inner side end of the outer member 3, via a predetermined interface. In addition, the connector 42 projects radially outward at a predetermined inclined angle.

As described above, the recess 35a of the connector 42 is reinforced by the metal core 43. The metal core 43 is arranged to extend along the end of the outer member 3 to cover the recess 35a and the inner circumference of the connector 42. In addition, the pressing force applied to the connector 42 during connection of a harness is mostly all received by the end of the outer member 3. Thus, it is possible to prevent a large force from being applied onto the sealing ring and the wheel speed sensor. Accordingly, it is possible to increase the rigidity and the strength of the connector 42 which, in turn, improves the accuracy during assembly. In addition, the design improves the separation of the metal core 43 and the connector 42. Also, it improves prevention of the entry of rain water or muddy water through the interface between the metal core 43 and the connector 42. Thus, the durability of the connector 42 can be improved.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

The wheel bearing apparatus incorporating with a wheel speed detecting apparatus of the present disclosure can be applied to a wheel bearing apparatus provided with any type of wheel speed detecting apparatus.

What is claimed is:

1. A wheel bearing apparatus incorporating with a wheel speed detecting apparatus comprising:

an outer member integrally formed on its outer circumference with a body mounting flange to be mounted on a suspension apparatus of a vehicle, said outer member having an inner circumference including double row outer raceway surfaces;

an inner member including a wheel hub and an inner ring, the wheel hub having at one end an integrally formed wheel mounting flange and on its outer circumference and an axially extending cylindrical portion, the inner ring is fit onto the cylindrical portion of the wheel hub, the inner member is formed, on its outer circumference, with double row inner raceway surfaces that are arranged opposite to the double row outer raceway surfaces;

double row rolling elements are freely rollably contained between the inner and outer raceway surfaces, respectively, of the inner member and the outer member;

seals are mounted in annular openings formed between the outer member and the inner member; and a sensor holder is formed by injection molding synthetic resin, a wheel speed detecting sensor is embedded in said resin, said sensor holder is mounted on an inner side end of the outer member;

an inner side seal of the seals includes:

a slinger press formed from a steel plate into a substantially L-shaped cross-section, said slinger mounted onto an outer circumference of the inner ring;

a pulser ring has an encoder with circumferential characteristics that alternately and equidistantly change, the pulser ring is bonded to a pulser ring metal core that is press fit onto a cylindrical portion of the slinger;

a sensor holder metal core is press formed from a steel plate and insert-molded into the sensor holder so that an outer circumference of the sensor holder metal core, molded in the sensor holder, is formed so that it is bent to surround the end of the outer member and the metal core includes an outer circumferential portion extending from a first cylindrical portion radially outward, and the outer circumferential portion is positioned adjacent along the end of the outer member, the outer circumferential portion and the first cylindrical portion forming a substantially L-shaped cross-section; and a sealing member is integrally bonded to the sensor holder metal core and seals against the pulser ring metal core;

a connector for electrically connecting the wheel speed detecting sensor to a harness, connected to an electronic circuit, is mounted at a predetermined position on the circumference of the sensor holder and projects radially outward from the circumference at a predetermined incline, and a recess is formed in the connector.

2. The wheel bearing apparatus incorporating a wheel speed detecting apparatus of claim 1, wherein the pulser ring is fit onto the slinger and the encoder is integrally bonded on an outer circumference of the pulser ring.

3. The wheel bearing apparatus incorporating a wheel speed detecting apparatus of claim 1, wherein the seal member has a plurality of sealing lips and the sealing lips slidingly contact the slinger and/or the pulser ring.

4. The wheel bearing apparatus incorporating a wheel speed detecting apparatus of claim 1, wherein the sensor holder metal core includes the first cylindrical portion press-fit into the inner circumference of the end of the outer member, a second cylindrical portion molded in the sensor holder, and an inner circumferential portion extending from the first cylindrical portion radially inward along an inner circumference of the connector and having a substantially L-shaped cross-section, and the sensor holder being secured onto and contacting the outer circumference of the end of the outer member.

5. A wheel bearing apparatus incorporating with a wheel speed detecting apparatus comprising:

an outer member integrally formed on its outer circumference with a body mounting flange to be mounted on a suspension apparatus of a vehicle, said outer member having an inner circumference including double row outer raceway surfaces;

an inner member including a wheel hub and an inner ring, the wheel hub having at one end an integrally formed wheel mounting flange and on its outer circumference and an axially extending cylindrical portion, the inner ring is fit onto the cylindrical portion of the wheel hub, the inner member is formed, on its outer circumference, with double row inner raceway surfaces that are arranged opposite to the double row outer raceway surfaces;

double row rolling elements are freely rollably contained between the inner and outer raceway surfaces, respectively, of the inner member and the outer member;

seals are mounted in annular openings formed between the outer member and the inner member; and a sensor holder is formed by injection molding synthetic resin, a wheel speed detecting sensor is embedded in said resin, said sensor holder mounted on an inner side end of the outer member; and the sensor holder being secured onto and contacting the outer circumference of the end of the outer member;

an inner side seal of the seals includes:

a slinger press formed from a steel plate into a substantially L-shaped cross-section, said slinger mounted onto an outer circumference of the inner ring;

a pulser ring has an encoder with circumferential characteristics that alternately and equidistantly change;

a metal core is press formed from a steel plate and insert-molded into the sensor holder, the metal core further comprises a first cylindrical portion press-fit into the inner circumference of the end of the outer member, an outer circumferential portion extending radially outward from the first cylindrical portion along the end portion of the outer member, the first cylindrical portion and outer circumferential portion having a substantially L-shaped cross-section, a second cylindrical portion molded in the sensor holder, an inner circumferential portion extends radially inward from the first cylindrical portion along the inner circumference of the outer member and has a substantially L-shaped cross-section; and a sealing member is integrally bonded to the sensor holder metal core and seals against a metal core of the pulser ring;

a connector for electrically connecting the wheel speed detecting sensor to a harness, connected to an electronic circuit, is mounted at a predetermined position on the circumference of the sensor holder between the metal core cylindrical portion and the inner circumferential portion and projects radially outward from the circumference at a predetermined incline, and a recess is formed in the connector.

* * * * *